United States Patent [19]
Ross

[11] 3,858,205
[45] Dec. 31, 1974

[54] BASE-BAND PRECOLLISION SENSOR WITH TIME DOMAIN GATING FOR PREVENTING FALSE RESPONSES

[75] Inventor: Gerald F. Ross, Lexington, Mass.

[73] Assignee: Sperry Rand Corporation, New York, N.Y.

[22] Filed: Oct. 6, 1972

[21] Appl. No.: 295,648

[52] U.S. Cl. .................... 343/7 ED, 343/112 CA
[51] Int. Cl. ............................................. G01s 9/04
[58] Field of Search .............. 343/7 ED, 112 CA

[56] References Cited
UNITED STATES PATENTS

| | | | |
|---|---|---|---|
| 3,011,580 | 12/1961 | Reid | 343/7 ED |
| 3,394,342 | 7/1968 | Walker | 343/7 ED |
| 3,448,822 | 6/1969 | LaLone et al. | 343/7 ED X |
| 3,659,203 | 4/1972 | Ross | 325/105 |
| 3,660,846 | 5/1972 | Anderson | 343/112 CA |
| 3,662,316 | 5/1972 | Robbins | 340/167 R |
| 3,686,669 | 8/1972 | Toulis | 343/55 A |

Primary Examiner—Malcolm F. Hubler
Attorney, Agent, or Firm—Howard P. Terry

[57] ABSTRACT

A dual receiver energy-amplifying signal-selecting sensor for sampling base-band signals, such as subnanosecond signals reflected from dangerous objects, is arranged to provide a substantial actuating signal for the operation of apparatus such as, for example, passenger protective or restraining apparatus for use in the event of a vehicular collision. The sensor system includes dual broad-band transmission line receiver antennas cooperating with biased semiconductor avalanche detector elements located within the transmission lines for detecting substantially the total energy of any received base-band echo signal. The signal sensor detects the presence of a dangerous object in a limited forward azimuthal zone and only within a limited range span with respect to the protected vehicle, even though the transmission and reception antennas employed lack correspondingly high directionality.

3 Claims, 7 Drawing Figures

BASE-BAND PRECOLLISION SENSOR WITH TIME DOMAIN GATING FOR PREVENTING FALSE RESPONSES

CROSS REFERENCE

This invention is an improvement over the invention disclosed and claimed in the K. W. Robbins, G. F. Ross United States patent application Ser. No. 271,084 for "Stable Base-Band Superregenerative Selective Receiver," filed July 12, 1972, now U.S. Pat. No. 3,794,996, and assigned to the Sperry Rand Corporation.

BACKGROUND OF THE INVENTION

1. Field of the Invention

The invention pertains to means for the reception, selective gating, and wave form conversion of base-band or subnanosecond electromagnetic signals and more particularly pertains to means for stable reception and selective use of the presence of such base-band signals for the generation of alarm or control signals for safety purposes without spurious responses.

2. Description of the Prior Art

Generally, prior art signal selector or gating systems used in object detectors or sensors are associated with the gating of pulsed continuous wave carrier signals that are often each of many radio frequency cycles duration. The pulsed signal to be selected is normally in the form of a pulsed high frequency carrier signal, so that complex signal reception, amplification, and frequency conversion circuits must be used to process the signal prior to the selection or range gating step. Because such systems are complex and relatively inefficient, they are sensitive to many failure possibilities. Furthermore, conventional object detection receiver and signal gating systems are not capable of measuring ranges of very close by objects. Also, such selector or range gating circuits are not adaptable to the direct processing of short base-band nanosecond and subnanosecond signals.

One successful sensor for object detection by radiation and reception of base-band or subnanosecond electromagnetic pulses is the subject of the above-mentioned G. F. Ross et al. patent application Ser. No. 271,084; a system is taught therein for receiving and selectively gating very short base-band electromagnetic pulses and for generating an energy amplified output useful for operating utilization equipment. The systems of this latter and of other Ross patent applications referred to herein employ substantially dispersionless transmission line antenna arrangements cooperating with a semiconductor gating or selector device located directly within the antenna transmission line for detecting the total energy of in-coming base-band pulses. A cooperating circuit coupled to the gating device generates from the in-coming signal a corresponding output signal suitable for application in utilization devices incorporating generally conventional circuits of the type designed to process pulse signals of more normal duration.

While such gated base-band object sensor systems perform satisfactorily in many situations, they are sometimes undesirably responsive in adverse environments. In particular, certain problems arise because of the inherent characteristics of the base-band antennas required for use in a short pulse sensor otherwise enormously benefitted by other aspects of the nature of base-band pulse transmission and reception.

It will be understood that, generally, antennas which are broad band enough to propagate subnanosecond pulses without dispersion and consequent distortion, also have inherently wide effective radiation and receptivity patterns. Where it is desired to make the protective system sensitive to a dangerous object within about five feet of the sensor, the inherent widths of the patterns produced by base-band antennas are not a particular problem. If the sensor is to act when the dangerous object is, for example, ten to twelve feet forward of the sensor when operating to protect a car moving at a relatively high speed, such broad beam antennas may permit spurious responses, because vehicles traveling in lanes on either side of the protected vehicle may undesirably actuate the air bag or other protective system. The range gate normally employed in the prior art may permit the sensitive zone to extend beyond the sides of the protected vehicle, accordingly permitting spurious echoes on occasion to operate the actuator, a highly undesirable consequence.

SUMMARY OF THE INVENTION

The present invention relates to an electromagnetic energy pulse system for transmitting very short base-band pulses and for their reception by dual base-band receivers after reflection from objects to be detected. The base-band receivers process the base-band signals, generating energy amplified outputs for operating utilization equipment. The novel system employs dispersionless transmitter and receiver antenna and transmission line elements cooperating with receiver avalanche transistor detectors placed directly within the receiver transmission lines for detecting the total energy of each echo pulse. The receiver detectors are cyclically operated in a free-running pulsing mode which generates and stores a gain control signal for providing high stability and sensitivity of the receiver detectors each time they operate in their second or avalanche detector mode. A pair of amplified, time-extended pulses is generated by the receiver avalanche detectors each time an echo is present in both receivers during the detector mode. The detected signals are applied through an AND circuit to a range-gated avalanche detector which reliably yields a useful output signal for actuation of passenger or other protective equipment. By permitting such actuation to occur only within a predetermined range gate, and only when substantially equal-amplitude receiver outputs actuate the AND circuit, response to a dangerous object is permitted in a limited predetermined azimuthal zone forward of the protected vehicle, and freedom from false respones is assured.

DESCRIPTION OF THE PREFERRED EMBODIMENTS

The pulsed electromagnetic sensor system of the present invention is a device for sensing an impending collision of a vehicle with another predetermined vehicle or object and for operating certain protective equipment as a consequence of such sensing. It is designed to be placed at the front, for example, as represented by the dotted line 1 of FIG. 1, of such a protected vehicle, though it may be used in other directional relationships with respect to the protected vehicle.

A short or base-band pulse transmitter 2 may be employed in the invention and is actuated by a conventional current pulse generator 3 which serves to supply through inverter 6 any required synchronizing signals for the control of the paired pulse receivers 4 and 5 and additionally supplies time gating signals via capacitor 7 to other parts of the sensor yet to be described. If the sensor is located at the front 1 of the vehicle, transmitter 2 provides pulsed signals for forward radiation by an antenna such as dipole antenna 8. Signals reflected by any object back toward the protected vehicle are collected by receiver antennas 9 and 10 for supply to the respective pulse receivers 4 and 5, receiver antennas 9 and 10 being symmetrically located at the front 1 of the vehicle on either side of transmitter antenna 8.

Figures 1, 2:
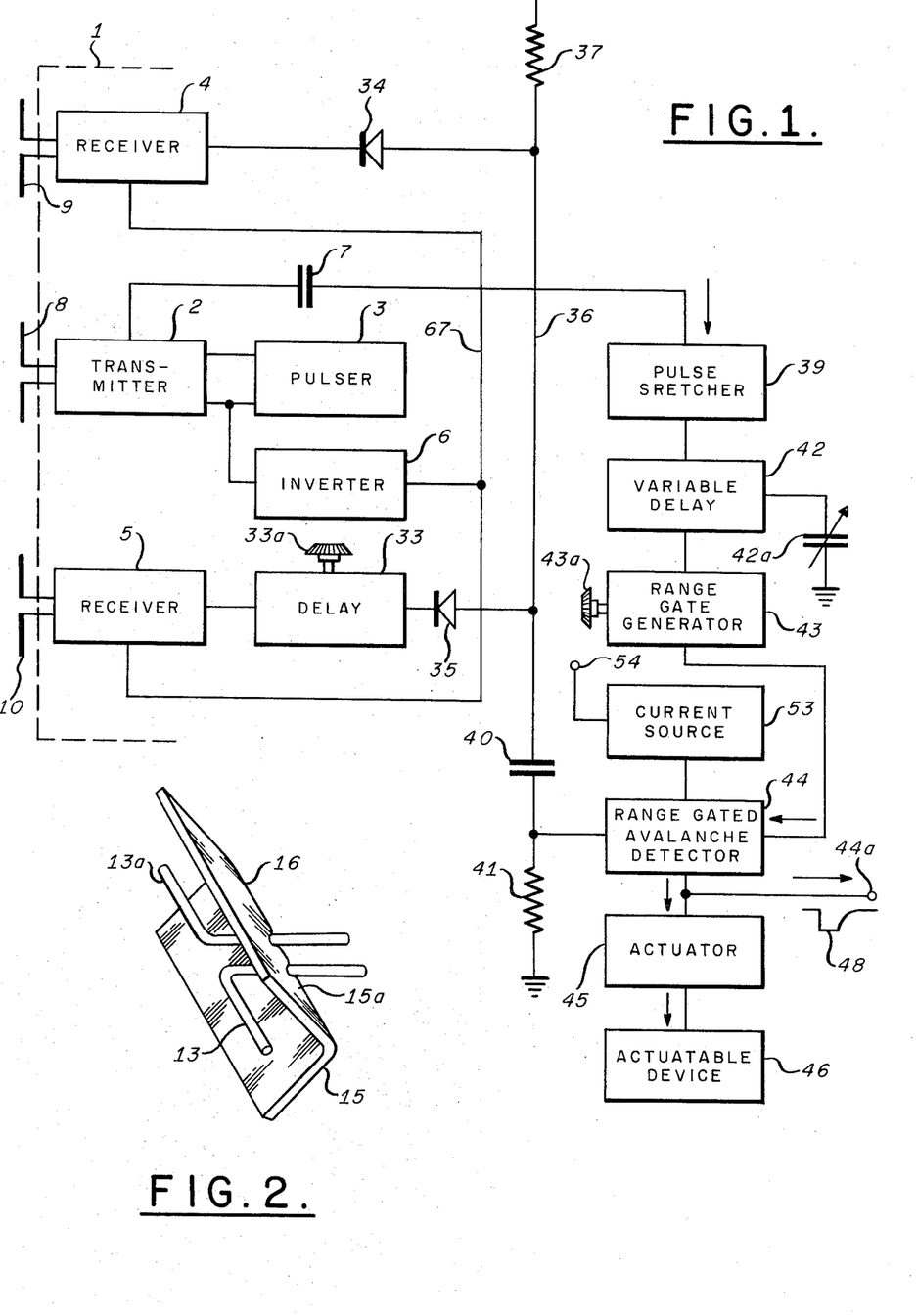
FIG. 1 is a block diagram of the invention showing its components and their electrical interconnections.
FIG. 2 is a perspective view of one of the antennas used in the system of FIG. 1.

Transmitter antenna 8 may take the general form shown in FIG. 2 with its electrical leads supporting dipole elements 13, 13a and projecting through clearance holes in the apex 16 of a reflector made up of similar flat conductor elements 15, 15a. The dipole 13, 13a lies in a plane generally bisecting the vee-shaped cross section of reflector 15, 15a. The dipole antenna 13, 13a inherently has a major degree of directivity in the horizontal or bisecting plane, and the vee-shaped reflector 15, 15a desirably adds directivity in the vertical plane or the plane perpendicular to the bisector plane. Other equivalent antenna feeds or reflectors may alternatively be employed.

Receiver antennas 9 and 10 are oriented so as to view objects illuminated by energy directed toward them by transmitter antenna 8. The similarly polarized receiver antennas 9 and 10 may also have a reflector structure generally similar to that of FIG. 2, but are coupled for collection of object-reflected pulse or base-band signals. In a representative application for measuring the distance between the front 1 of a first vehicle and the rear of a second, the centers of the antennas 8 and 9 and 8 and 10 may be spaced apart by about 60 centimeters with their dipole conductors horizontal. The dipole tips for each dipole pair may be about 10 centimeters apart.

The pulse transmitter 2 and its associated antenna 8 may take any of several forms, such as that of the G. F. Ross, D. Lamensdorf U.S. patent application Ser. No. 46,079 for a "Balanced Radiator System," filed June 15, 1970, assigned to the Sperry Rand Corporation, and issued as U.S. Pat. No. 3,659,203, June 15, 1972. Suitable transmitter and antenna arrangements are also illustrated in the G. F. Ross U.S. patent application Ser. No. 137,355 for an "Energy Amplifying Selector Gate for Base-Band Signals", filed Apr. 26, 1971, and issued July 31, 1973 as U.S. Pat. No. 3,750,025 and in the G. F. Ross U.S. patent application Ser. No. 145,154 for "A Base Band Short Range Precollision Sensor for Actuation of Vehicle Safety Apparatus," filed May 20, 1971, issued May 22, 1973 as U.S. Pat. No. 3,735,398 both applications being assigned to the Sperry Rand Corporation.

Figure 3:
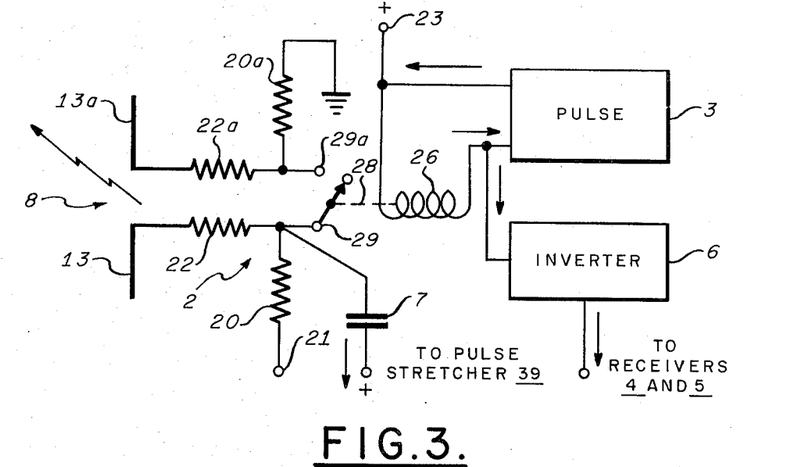
FIG. 3 is a circuit employed as the transmitter of FIG. 1.

A preferred form which transmitter 2 may take is illustrated by way of example in FIG. 3; the transmitter 2 is actuated by the conventional current pulse generator 3 which receives power via terminal 23 and which also may serve to supply synchronizing signals for the control of receivers 4 and 5. Flow of regular current pulses through coil 26 operates switch 27 for the purpose of periodically exciting transmitter 2 because of the action of mechanical connection 28 is alternately connect and disconnecting terminals 29 and 29a. Switch 27 may take other convenient forms, but is preferably a commercially available mercury-wetted, single pole, single throw, normally open, reed switch providing, upon closure, a current pulse therethrough having a 100 picosecond or smaller rise time. For example, suitable switches having fraction of an ohm in resistance when closed, a 300 volt make-break capability, and up to a 200 cycle per second operating frequency with a one millisecond closure time are readily available on the market.

Switch 27 is thus used periodically to pulse excite the radiator antenna 8, such as the dipole antenna having paired radiating dipole elements 13, 13a. Charging resistors 20, 20a are of relatively high value. Resistor 20 couples antenna conductor 13 to a potential source (not shown) coupled to terminal 21. Resistor 20a couples antenna conductor 13a to ground. The paths from terminals 29, 29a to the respective antenna conductors 13, 13a pass through similar matching resistors 22, 22a. Resistors 20, 20a may be 10 megohms each, while resistors 22, 22a may be 100 ohms. Closure of switch 27, occurring about 1 millisecond after driver coil 26 is energized, causes a fast rise base-band pulse to be propagated through the transmission line including resistors 22, 22a and the respective dipole elements 13, 13a and to be launched into space by the latter. Power is supplied to terminal 23 only when the vehicle is traveling above a predetermined speed, so as to prevent undesired responses when parking and the like.

Figure 4:
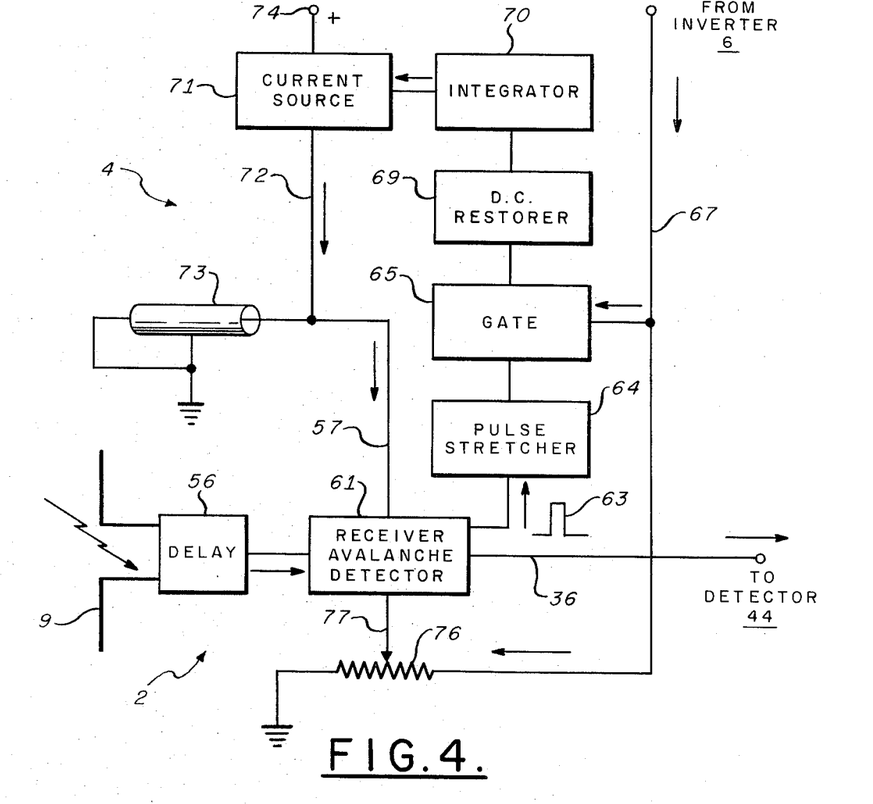
FIG. 4 is a block diagram of a receiver circuit used in the receivers of FIG. 1.

The paired similar receivers 4 and 5 of FIG. 1 may each be base-band receivers of the general kind described in the K. W. Robbins U.S. patent application Ser. No. 123,720, filed Mar. 21, 1971, issued May 9, 1972 as U.S. Pat. No. 3,662,316, entitled "Short Base-Band Pulse Receiver," and assigned to the Sperry Rand Corporation. Receivers of the base-band type are also described by G. F. Ross in the U.S. patent application Ser. No. 137,355, filed Apr. 26, 1971, entitled "Energy Amplifying Gate for Base Band Signals", now U.S. Pat. No. 3,750,025, and assigned to the Sperry Rand Corporation. A particular receiver that will be further discussed in connection with FIGS. 1 and 4 is an adaptation of the receiver of the K. W. Robbins, G. F. Ross U.S. patent application Ser. No. 271,084, filed July 12, 1972, entitled "Stable Base-Band Superregenerative Selective Receiver," now U.S. Pat. No. 3,794,996, and assigned to the Sperry Rand Corporation.

In FIG. 1, the outputs of receivers 4 and 5 are respectively coupled through conventional hot carrier diodes 34 and 35 to a common lead 36. Diodes 34 and 35 may be of the HP5082-2815 kind and are connected in common via lead 36 through resistor 37 to a source of bias supply (not shown) connected to terminal 38. The circuit including diodes 34 and 35 and elements 36, 37, and 38 comprises a conventional high speed AND network, where the hot carrier diodes are respectively used to sample the outputs of the respective receivers 4 and 5. When, for example, there is at any one instant of time a simultaneous output from receiver 4 and from receiver 5, an AND signal appears upon the common lead 36. Any such AND signal on lead 36 is coupled by capacitor 40 across the grounded input resistor 41 to the range gated avalanche detector 44, which may employ a transistor of the 2N5130 kind as its primary element. The function of adjustable delay 33 located between receiver 5 and diode 35 remains to be discussed.

For control of the circuit associated with the range gated avalanche detector 44, a synchronizing signal derived at capacitor 7 in FIG. 3 is coupled to a conventional pulse stretcher circuit 39; circuit 39 extends the base-band pulse coupled by capacitor 7 to a length generally suitable for application to the conventional variable delay circuit 42. The amount of delay of the input pulse is determined by manually or electronically varying a parameter of an element of the conventional delay circuit 42, such as adjustable capacitor 42a, which, it is understood, may be an automatically or remotely adjustable varactor in certain applications. The amount of delay inserted by variable delay circuit 42 determines the time at which the conventional range gate generator 43 produces an output range gating pulse.

The range gate produced by range gate generator 43 is passed as a gating or enabling input to the range gated avalanche detector 44, to a second input of which is coupled the received echo pulses produced by receivers 4 and 5 and passed by AND diodes 34 and 35. Detector 44 is fed a constant current from regulated current source 53, which may employ an MPF 161 field effect transistor, derived from a supply (not shown) attached to terminal 54. When there is coincidence between the range gate and the echo waves collected by receivers 4 and 5, an output wave 48 is generated by the range gated avalanche detector 44 and will appear at the output terminal 44a thereof. The output wave 48 may be applied to a conventional actuator 45 to operate a conventional actuatable device 46, such as an airbag or other safety or passenger restraining device of the kind discussed in the above mentioned Ross patent application Ser. No. 145,154, now U.S. Pat. No. 3,735,398. The variable delay 42, range gate generator 43, and avalanche range-gated detector 44 may be generally similar to corresponding elements shown, for example, in the aforementioned patent applications Ser. No. 137,355, now U.S. Pat. No. 3,750,025, and Ser. No. 145,154, now U.S. Pat. No. 3,735,398.

It will be seen that the generation of output 48 for actuating passenger or other protective apparatus associated with the protected vehicle depends upon the unusual event of simultaneous outputs from receivers 4 and 5 and upon the actuation at the same time of range gated avalanche detector 44 by a range gate pulse generated at a predetermined time with respect to the time that transmitter 2 is pulsed. All three signals must be present at the range gated detector 44 to cause avalanche and to produce output wave 48. As in FIGS. 5 and 6, operation may be understood by considering that the first receiver antenna 9 is located at point $F_1$, the transmitter antenna 8 at point $F_1'$ (which coincides with the location of point $F_2'$, as will be explained), and the second receiver antenna 10 at point $F_2$. The points $F_1$ and $F_1'$ will be seen to be the focal points of a principal or median ellipse 50, while points $F_2$ and $F_2'$ are the focal points of a principal or median ellipse 51. The cross-over 49 of median ellipses 50 and 51 represents a median point in a predetermined space 60 within which the sensor is to be made sensitive to the presence therein of a reflecting object.

Let the space 60 be further defined by assuming that the range gate to be formed by range gate generator 43 corresponds to a gated distance of $2\Delta$. Two pairs of corresponding boundary ellipses may thus be formed about the cross-over or median location 49, which pairs intersect to define four points or corners 52, 52a, 55 and 55a which therefore define space 60 with precision. It will be understood that the median point 49 and consequently space 60 may be moved in or out along line 62 by adjusting the control 42a of variable delay 42 and that its size may be changed by adjusting in a conventional manner the size of the range gate formed within range gate generator 43 by use of manual control 43a. Should it be desired to scan or otherwise move the location of space 60 along line 62 as in FIG. 6, variation of a control element such as the variable capacitor 42a will accomplish such as purpose. FIG. 6 thus illustrates the location of near, median, or far gates 58, 59, 60 formed in this manner. By operating adjustment 33a of the delay device 33 of FIG. 1, the sensitive area may be moved to the right or to the left of line 62 of FIG. 5, as is seen at 68 in FIG. 6.

It is thus understood that when a target falls within space 60 as defined by points 52, 52a, 55 and 55a, for example, an output pulse will be generated by each of receivers 4 and 5 at substantially the same instant of time, producing an output from AND diodes 34, 35 on lead 36 which, in turn, causes the range gated avalanche detector 44 to avalanche and to conduct, since it will have been enabled by range gate generator 43. In the normal circumstance in which the target falls outside of space 60, one or the other outputs of receivers 4, 5, will be too small to produce a suitable AND circuit output, or the range gate wave will not enable avalanching of detector 44; there is no output wave 48 in either circumstance and the protective device will not be actuated.

Figure 5:
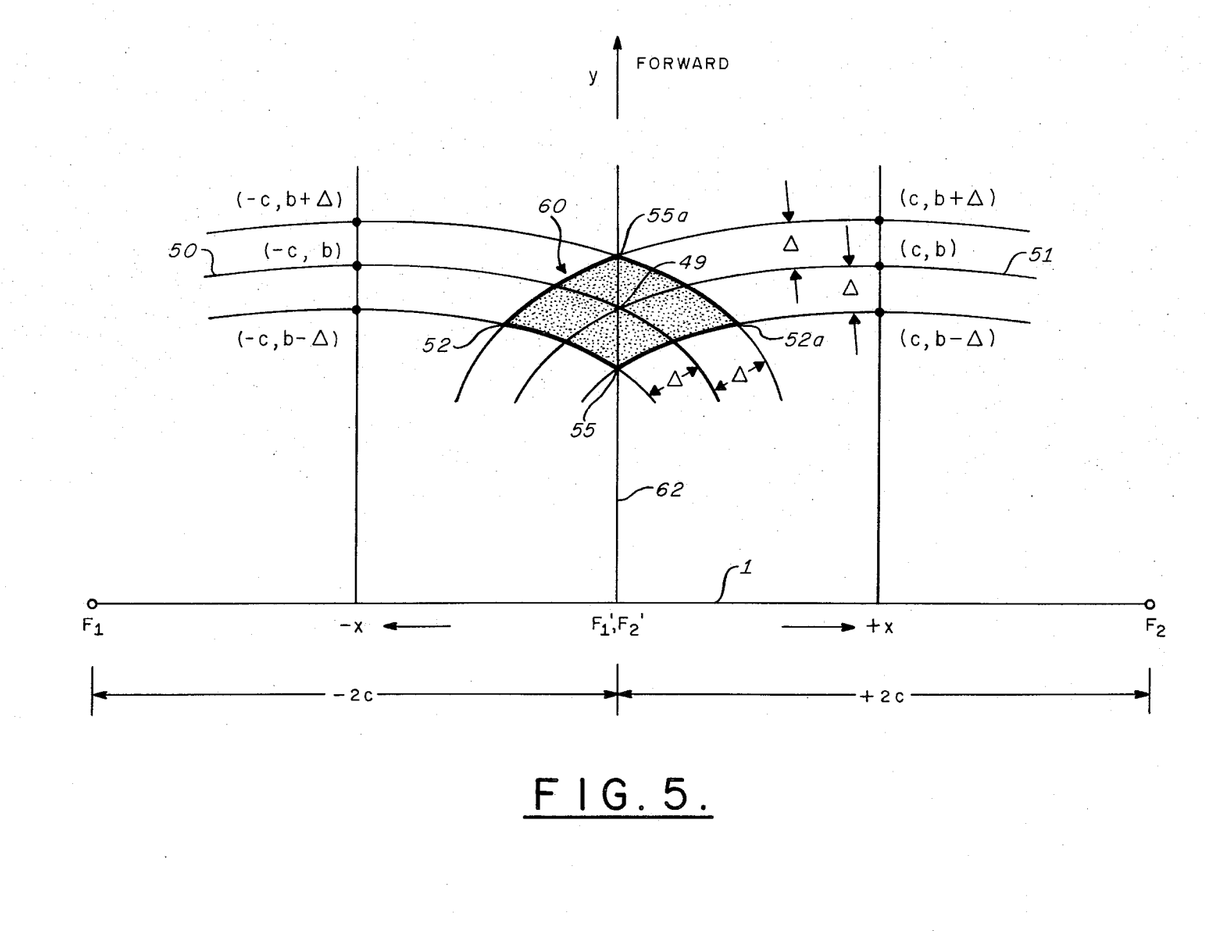
FIGS. 5, 6, and 7 are graphs useful in explaining the operation of the invention.
Figure 6:
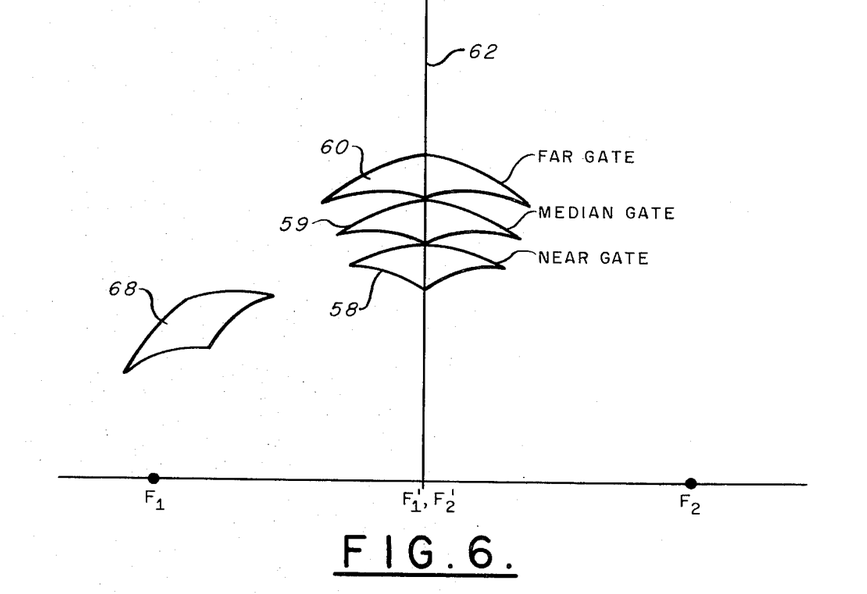
Figure 7:
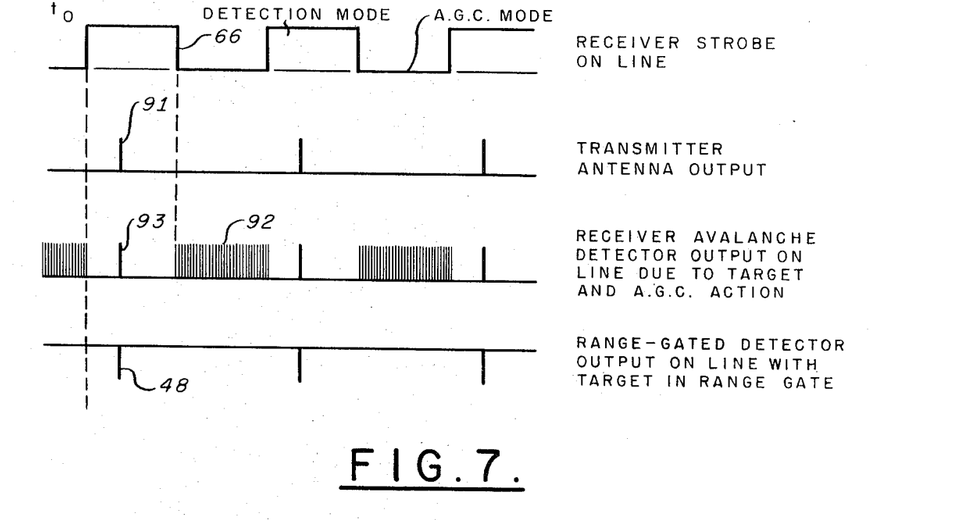

The graphs of FIGS. 5 and 6 are somewhat distorted in proportion for the sake of clarity, since the limited forward azimuthal zone or space 60 will normally be about 10 feet forward of the front of the vehicle, for example, while the distance between focal points $F_1$ and $F_2$ will be from 2 to 3 feet, for example. The exact locations of points 52, 52a, 55, and 55a may be determined through the application of simple analytic geometry or the conventional helix equations and practical locations may readily be selected by such ordinary procedures. For examples, assume ellipses 50, 51 each to have a major axis $2a$ and a minor axis $2b$, a distance between associated focal points ($F_1 - F_1'$, for example) of $2c$, and a range gate of $2\Delta$. Points 52, 55a, 52a and 55 are respectively located by solving in succession the following pairs of equations:

Point 52

$$\left. \begin{array}{l} (x+c)^2/(b-\Delta)^2 + c^2 + y^2/(b-\Delta)^2 = 1 \\ \\ (x-c)^2/(b+\Delta)^2 + c^2 + y^2/(b+\Delta)^2 = 1 \end{array} \right\} \text{for } y = 0, \; x \text{ negative}$$

Point 55a
$$(x+c)^2/(b+\Delta)^2 + c^2 + y^2/(b+\Delta)^2 = 1$$
$$x-c/(b+\Delta)^2 + c^2 + y^2/(b+\Delta)^2 = 1$$
$$y > 0, x = 0$$

Point 52a
$$(x+c)^2/(b+\Delta)^2 + c^2 + y^2/(b+\Delta)^2 = 1$$
$$x-c/(b-\Delta)^2 + c^2 + y^2/(b-\Delta)^2 = 1$$
$$y > 0, x \text{ positive}$$

Point 55
$$(x+c)^2/(b+\Delta)^2 + c^2 + y^2/(b-\Delta)^2 = 1$$
$$(x-c)^2/(b-\Delta)^2 + c^2 + y^{2n0} - \Delta^{r2} = 1$$
$$y > 0, x = 0$$

The following values of $c$, $\Delta$, and $b$ are representative:

$c = 2$ feet,
$\Delta = 0.5$ feet,
$b = 11$, 12, or 13 feet.

For a typical set of circumstances with $b = 11$ feet, points 52 and 52a are 10.47 feet in front of the vehicle and are 2.83 feet on either side of median line 62. For $b = 12$ feet, points 52 and 52a are 11.45 feet in front of the vehicle and 3.08 feet on either side of the median line 62. For $b = 13$ feet, points 52, 52a are 12.43 feet in front of the vehicle and are 3.32 feet on either side of line 62. Accordingly, the dual antenna system readily defines a particular azimuthal zone or limited space in front of the vehicle in which a response will be generated from a reflecting object. Vehicles passing in lanes on either side of the protected vehicle will not simultaneously produce the three afore-described required reactions, and the device 46 will not be actuated. Stationary objects such as fire plugs or postal collection boxes at the side of the road way desirably fail to cause a response of actuator 45.

While, as noted above, various kinds of base-band receiver concepts may be employed in receivers 4 and 5, including that of the aforementioned Robbins U.S. Pat. No. 3,662,316, it is preferred to employ the kind of receiver described in the aforementioned U.S. patent application Ser. No. 271,084, now U.S. Pat. No. 3,794,996. Such a receiver permits the total energy of each baseband echo pulse to be instantaneously supplied by the receiver antenna to an avalanche receiver detector, that detector being able to operate successfully with short base-band pulses having spectral components the amplitudes of which are all incapable of detection by conventional narrow band receivers. The total energy in each base-band pulse can, however, be relatively larger than the level of noise or other interfering pulses or signals in the vicinity of the receiver detector. Thus, by appropriately adjusting the sensitivity or threshold of the receiver detector, base-band signals not affecting other receivers are readily received, detected, and processed without the receiver detector being adversely affected in substantial degree by other radio energy transmissions. The major processing of the echo signal is accomplished, according to the invention, by simple base-band signal circuits, thus avoiding the need for signal frequency conversion and the problems associated with alignment and operation of conventional radio annd intermediate frequency amplifiers.

The preferred receiver is illustrated in FIG. 4; receiver 4 is discussed by way of example, since the description might equally well be made in terms of the structure and operation of receiver 5. The receiver 4 is connected to receiver antenna 9 and operates synchronously with transmitter 2 in regularly alternating modes. In a first of the alternating modes, a principal receiver element operates as a variable frequency free-running pulse generator in a feed back loop for automatically controlling over-all receiver sensitivity or gain. In a second mode, cyclically alternating with the first mode, free-running pulse generation is inhibited and the principal receiver element operates only in the presence of a range gate, the threshold sensitivity being a function of the level of the fed back current generated during the first mode.

Receiver antenna 9 is connected to receiver 4 through a trimming delay circuit 56 which serves the usual role of adjusting relative delays of parallel channels within a pulse system. The output of delay circuit 56 is coupled as an input to the base of the receiver avalanche detector 61 which may be an avalanche transistor detector of the 2N5130 type previously described in the above-mentioned patent application Ser. No. 137,355, now U.S. Pat. No. 3,750,025, and elsewhere, and whose collector electrode is supplied with substantially constant or controlled current via lead 57. The output 63 of the receiver avalanche detector 61 is taken from its emitter electrode and is applied to a conventional pulse stretcher 64 which may be a conventional single-shot multivibrator. This pulse output 63 is supplied via lead 36 of FIG. 1 to the range gated detector 44 and may be about 2 microseconds long.

A second or mode gating input for gate circuit 65 is a synchronizing signal 66 (FIG. 6) supplied by the transmitter current pulse generator 3 through inverter 6 and lead 67 to mode gate 65. The gated output of mode gate 65 is coupled to a conventional direct current restorer diode circuit 69 and through a conventional resistance-capacitor integrator circuit 70 to the conventional regulated current source 71. Source 71 receives power from a conventional supply (not shown) coupled to terminal 74. The output of source 71 is supplied via leads 72 and 57 to control the operation of the transistor within receiver avalanche detector 61. A branch line at the junction of leads 57 and 72 includes a shorted transmission line 73 approximately 30 centimeters long. The delay transmission line 73 determines the length of each output pulse generated by the receiver avalanche detector 61. It is seen from FIG. 6 that the output of receiver detector 61 in the first mode of the system is a series of trains 92 of narrow pulses, the receiver avalanche detector 61 and its associated loop operating as a free-running pulse generator. Manual adjustment of the contact 77 of potentiometer 76 determines the sensitivity of the receiver detector 61, potentiometer 76 being coupled between ground and the lead 67 being connected through inverter 6 to the current pulse generator 3.

In operation, it is seen that the receiver avalanche detector 61 is allowed to operate as a conventional free-running pulse generator during alternately successive time intervals to form the pulse trains of wave 92. The output pulse train 92, after stretching by circuit 64, is subjected to direct current restoration by circuit 69 and is integrated (70). The unidirectional voltage thus generated is fed back through regulator 71 to control the current flowing through the receiver avalanche detector 61. This operation determines the sensitivity of the receiver avalanche detector 61. The larger the current through detector 61, the higher its pulse repetition frequency and the higher the unidirectional current controlling current regulator 71. The increasing bias voltage fed to current source 71 is fed in such a way as to decrease current through the receiver avalanche detector 61 and therefore to decrease its sensitivity.

When the drive signal is applied to operate transmitter switch 27, a version of the same pulse is fed via the conventional inverter 6 and lead 67 to mode gate 65 to inhibit the free-running pulse generation mode of the circuit. However, the operating current fed by current source 71 to the receiver avalanche detector 61 remains substantially constant, since the time constant of d.c. restorer 69 and the integrator 70 is relatively large (for example, greater than 100 milliseconds). Thus, if the duty cycle of the receiver 4 is 50 per cent, the receiver is in effect a wide-open detector 50 percent of the time. In certain applications, a duty cycle as high as 90 per cent is preferred. Whenever an echo pulse exceeding the arbitrary threshold amplitude is collected by antenna 9, the receiver avalanche detector 61 conducts, yielding a pulse 63 at its output. The absolute sensitivity level is set by the tap 77 of bias potentiometer 76.

The output of the receiver avalanche detector 61 is a pulse 93 (FIG. 6) which is fed through the AND diodes 34, 35 to the base of the avalanche transistor of the range-gated avalanche detector circuit 44 along with the output of receiver 5. The emitter of the transistor of detector 44 is normally held off by a small bias (+3 volts, for example). The range gate from generator 43 is coupled to the emitter electrode of avalanche detector 44. As noted above, if there is coincidence between pulses 48 from receivers 4 and 5 and the range gate, then the range gated detector 44 is activated and the useful output pulse 48 is formed for operating protective device 46.

It is seen that the invention makes effective use of the advantageous properties of signal transmission and reception of base-band signals by employing a transmission line system or other medium having non-dispersive characteristics. Preferably, the antenna and transmission line elements operate in the TEM mode, avoiding use of propagation modes that permit dispersion of base-band pulses. In this manner, the full energy of each received base-band pulse originally generated by transmitter 2 is efficiently directed for processing within the amplifying receiver avalanche detectors of receivers 4 and 5 and for selective gating within the range-gated avalanche detector 44.

It is seen that the invention provides means having precise gain control for the precise sampling of short-duration electromagnetic waves wherein the sampling time and sampling duration depend upon reliably stable elements and that the system employs stable, balanced, non-dispersive transmission line elements for preventing distortion of the base-band echo signals to be sampled. The invention is capable of operation at very fast echo sampling rates, permitting the sampling and processing of echo signals of duration of the order of 1 nanosecond or less.

It is seen that the system overcomes the difficulties of the prior art in that reliable operation without false responses is assured. The probability of an externally generated electrical noise spike being actually coincident in time with the range gate is remote. The unidirectional voltage level which determines the threshold sensitivity of the receiver avalanche detector is substantially invariant. More important, false responses due to motion of vehicles in adjacent traffic lanes are avoided, as are also avoided responses due to the presence of metal road side objects such as bridge rails, fences, and the like. Use of the invention permits retention of the desirable very broad band or dispersionless response of base-band antennas and easily overcomes the inherent lack of high directivity of such antennas.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Vehicle borne protective precollision apparatus comprising:
   transmitter means for radiating base-band electromagnetic pulses into a region of space in a portion of which a collision with an object will probably occur,
   first and second receiver means symmetrically disposed with respect to said transmitter means for receiving base-band electromagnetic pulses reflected from said object when in said region of space,
   AND circuit means responsive to substantially simultaneous pulse outputs of said first and second receiver means and providing a pulse response only when said object is in a limited azimuth sector of said portion,
   gate circuit means synchronously responsive to said transmitter means and responsive to said AND circuit means for producing a pulse output only when said object is in a limited range zone of said limited azimuth sector of said portion spaced from said transmitter means, and
   utilization means responsive to said gate circuit means including:
     actuator means, and
     means actuatable by said actuator means,
   said AND circuit means including:
     first and second diode means respectively coupling said first and second receiver means to a common junction,
     source means coupled to said common junction for supplying electrical bias to said first and second diode means, and
     impedance means for coupling said common junction to said gate circuit means.

2. Apparatus as described in claim 1 wherein said gate circuit means comprises:

range gate generator means synchronously responsive to said transmitter means,
current source means, and
range gated avalanche detector means responsive to said range gate generator means, to said current source means, and to said impedance means when generating an output signal.

3. Apparatus as described in claim 2 additionally including in series relation between said transmitter means and said range gated avalanche detector means:
pulse stretcher means, and
adjustable delay means.

* * * * *